United States Patent [19]

Hurley

[11] 4,306,835
[45] Dec. 22, 1981

[54] AIR PURGING UNIT FOR AN OPTICAL PYROMETER OF A GAS TURBINE ENGINE

[75] Inventor: John F. Hurley, Easton, Conn.

[73] Assignee: Avco Corporation, Stratford, Conn.

[21] Appl. No.: 96,096

[22] Filed: Nov. 20, 1979

[51] Int. Cl.$^3$ ............................................. F01D 25/00
[52] U.S. Cl. .................................... 415/118; 350/63; 356/43
[58] Field of Search ........................ 350/63; 356/43; 60/39.75; 415/118

[56] References Cited

U.S. PATENT DOCUMENTS 2,814,953 12/1957 Callaghan ............................ 356/43
4,112,763 9/1978 Pirlet .................................... 350/63

FOREIGN PATENT DOCUMENTS 651093 3/1951 United Kingdom ........... 60/39.82 S
1411285 10/1975 United Kingdom ................. 356/43

Primary Examiner—Robert E. Garrett
Attorney, Agent, or Firm—Ralph D. Gelling

[57] ABSTRACT

In order to measure the temperature of the mid-span first stage rotor blade of a gas turbine engine, an optical pyrometer is mounted in the inner casing of the gas turbine engine and includes an elongated sight tube extending from the optical lens of the pyrometer and through the wall of the engine separating the inner casing from the rotor. The sight tube includes an array of spaced apertures extending therethrough in the vicinity of the optical lens, with each aperture extending at an acute angle to the longitudinal axis of the sight tube away from the optical lens. Pressurized air within the inner casing passes through the array of apertures and effectively forms a conically-shaped fluid screen for preventing smoke, dust, fumes, or other contaminants from contaminating the optical lens. A second fluid screen may be provided by mounting the free end of the sight tube in an enlarged opening in the wall of the engine casing, whereby a secondary, generally cylindrical flow of air is developed for shielding the open end of the sight tube. The upstream edge of the sight tube may project into the flow path of the combustion gases flowing to the rotor stage whereby such combustion gases will be deflected and directed around the circumference of the sight tube to further inhibit contaminants from entering the sight tube and contaminating the optical lens.

8 Claims, 7 Drawing Figures

AIR PURGING UNIT FOR AN OPTICAL PYROMETER OF A GAS TURBINE ENGINE

The present invention relates to a new and improved air purging unit for a radiation pyrometer as mounted in a gas turbine engine, and more particularly, an air purging unit including an elongated sight tube which enables the development of a primary fluid screen and a secondary fluid screen which continuously purges the region in front of the optical lens of the pyrometer with clear compressor discharge air to minimize lens contamination and corresponding output signal attenuation of the pyrometer.

In a gas turbine engine, it is necessary to measure the temperature of one or more rotor stages in order to provide information signals to the fuel control system of the engine, and to also provide signals to the over-temperature indicator for the engine. Heretofore, it has been known to utilize conventional thermocouples which necessarily must be mounted on a stationary part of the engine adjacent the rotating rotor stage, the temperature of which must be measured. Utilizing the results of heat transfer studies and structural analysis studies, it is possible to calculate the temperature of the rotating rotor stage as a function of the measured temperature of the thermocouple as mounted on the stationary part. As can be readily appreciated, in the calculation of the rotor temperature, many assumptions must be made concerning heat transfer factors between the moving rotor parts and the stationary part on which the thermocouple is mounted under various operating conditions of the engine and thus the accuracy of the calculated temperature is questionable.

It has also been known to employ a radiation pyrometer for measuring the temperature of a rotating blade of a rotor stage. A pyrometer is an instrument using an optical sight system, detector, and electronics to observe temperature of the rotating part. No physical contact is made with the blade surface, and the measurement by the optical pyrometer is a direct measurement thereby eliminating the computation complexities that are associated with the use of a conventional thermocouple. Through the electronics of the radiation pyrometer, maximum, minimum, and average temperatures of the blades are readily measured.

One of the primary problems associated with the radiation pyrometer is that the sight path of the optical lens of the pyrometer must be maintained substantially free of smoke, dust, fumes, and other contaminants, or else the optical signal received by the radiation pyrometer will be inaccurate, thereby resulting in an inaccurate temperature output signal of the radiation pyrometer. An air purge unit for maintaining a clean sight path of a radiation pyrometer is disclosed in U.S. Pat. No. 3,436,965 to Land, and basically comprises a tube disposed about the window end of the pyrometer, with an outer wall being disposed concentric to said tube to form an annular purging air chamber. At the free end of the concentric tube and outer wall, a diffusing plate is provided, and a converging open-ended tubular extension is disposed on the outer wall. An inlet connected to a source of purging air is provided to the annular purging chamber, and passes through the diffuser plate and then through the converging open-ended tubular extension. The air flow through the extension inhibits contaminants from entering the tube and contaminating the window end of the pyrometer. The construction of the air urge unit disclosed in U.S. Pat. No. 3,436,965 is relatively complicated and bulky, and requires a separate source of purging air, whereby it is not particularly suited for use in an advanced gas turbine engine.

Accordingly, it is the object of the invention to provide a new and improved air purging unit for a radiation pyrometer as embodied in a gas turbine engine which does not require a separate source of purging air, which is of simple construction, and which is efficient in minimizing lens contamination and corresponding output signal attenuation of the radiation pyrometer.

It is a further object of the subject invention to provide a new and improved air purging unit for a radiation pyrometer which includes means for forming a primary fluid screen, as well as a secondary fluid screen for preventing lens contamination.

It is still a further object of the subject invention to provide an air purging unit for a radiation pyrometer embodied in a gas turbine engine which utilizes the pressurized compressor air which is normally present within the engine casing for forming the primary and secondary fluid screens for preventing lens contamination.

It is another object of the subject invention to provide an air purging unit for a radiation pyrometer which is mounted in the wall of an engine casing such that the flow of combustion gases is deflected away from the air purging unit, thus further minimizing lens contamination.

The above and other objects and advantages of the invention will become apparent from a reading of the following detailed description taken in conjunction with the drawings in which.

Figure 1:
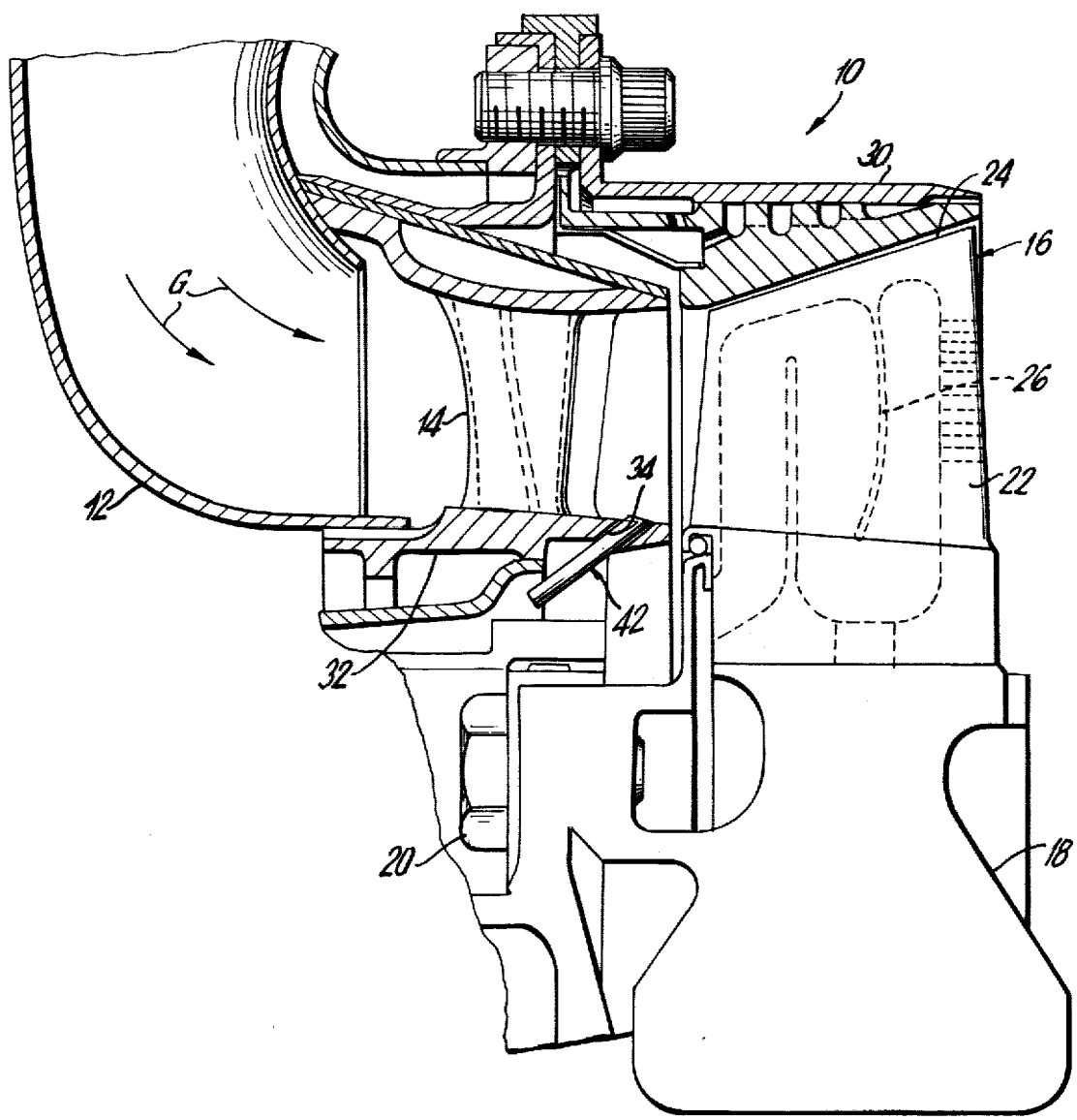
FIG. 1 is a partial cross-sectional view of the first rotor storage of a gas turbine engine, including the air purging unit of the subject invention.

Turning to FIG. 1, the first stage of a gas producer turbine is designated by the numeral 10 and is connected to the combustion chamber (not shown) by an annular combuster outlet 12. The combustion gases are designated by the arrows G, and are hot, low velocity, high pressure gases including many contaminants such as dust, dirt particles, uncombusted particles, and fumes. The combustion gases are provided to the turbine and initially encounter the first stage stator vane 14, followed by the first stage blades 16 of the turbine rotor. Each rotating blade 16 is attached to the turbine disk 18 by conventional "fir tree" attachment means, and further includes an airfoil portion 22, with the blade tips being designated by the numeral 24. The airfoil portion 22 may include air cooling passageways, as shown by the dotted lines, and designated by the numeral 26. Extending about and surrounding the first stage rotor blade 16 is an annular shroud or cylinder 30, while an inner, annular casing wall 32 defines the inner chamber to which a small percentage, on the order of three percent of pressurized airflow is provided from the engine compressor (not shown). The compressor airflow is ducted to the air cooled passageways 26 of the rotor blade 16 for cooling thereof. Whereas the hot combustion gases G have many impurities and contaminants therein, the pressurized airflow within the central cavity defined by the annular casing wall 32 is cool, relatively clean pressurized air, and thus is an available source of clean cooling air for use with the air purging unit of the subject invention.

Figure 2:
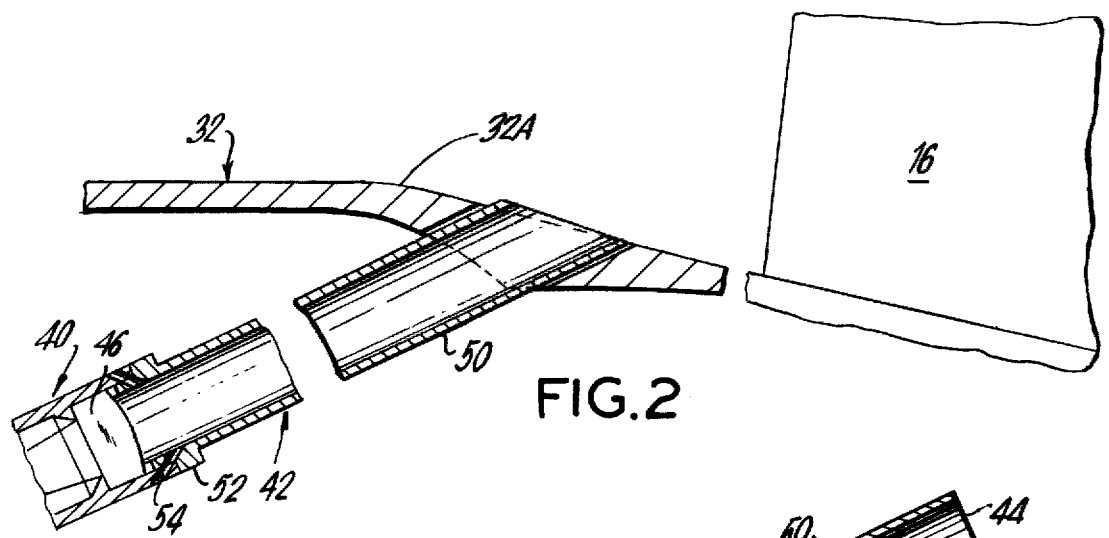
FIG. 2 is a partial cross-sectional view illustrating the air purging unit of the subject invention.

Referring to FIGS. 1-4, the end of the pyrometer including the optical sight portion 40 is connected to the air purging unit 42 of the subject invention, with the distal end 44 of the air urging unit extending through an opening 34 in the wall 32 upstream of the first stage blades 16 of the turbine rotor. As shown in FIGS. 1 and 2, the air purging unit 42 is mounted at an angle relative to the casing wall 32 such that the line of sight of the optical sight system 40 is directed toward the mid-span of the rotor blade 16 for detecting the temperature at that location. The temperature signal developed by the pyrometer is then transmitted to the engine fuel control system (not shown) and in addition, may be transmitted to other controls which monitor the maximum temperature of the first stage of the turbine.

The optical sight portion 40 of the radiation pyrometer includes an optical lens 46 which must be maintained clean in order for the pyrometer to function properly. As can readily be appreciated, if the optical lens 46 becomes dirty because of contamination by virtue of dust, fumes, smoke or other contaminants from the combustion gases G or from other parts of the engine, the signal passing through the lens 46 will be attenuated, whereby the electronics portions of the pyrometer will indicate a temperature which is less than actually exists in the first rotor stage. In effect, the signal passing through the dirty optical lens 46 will be filtered, and the resulting output of the radiation pyrometer will be an erroneous, lower temperature indication. If the incorrect signal is provided to the fuel control system of the engine, it would indicate to the engine control system that the temperature within the first stage rotor is less than actually exists. As a result, the fuel control system will have a tendency to direct that more fuel be provided to the combustion chamber, thereby possibly resulting in the development of excessive temperatures within the combustors and thus within the engine. Further, the erroneous output signal of the pyrometer may also be provided to temperature limiting devices which monitor the temperature of the turbine components to insure that they are operating within designated limits. Under those conditions, the temperature limiting devices will indicate that the engine components are operating within tolerable limits and thus continued operation of the turbine at the excessive temperatures could result in reducing the life of the turbine, and also eventually lead to failure of the components of the engine, and to failure of the engine itself. Accordingly, it is of extreme importance that the optical lens 46 be maintained clean and free of contaminants whereby a true indication of the temperature of the first stage rotor 16 is provided to the electronics portion of the radiation pyrometer.

Figure 4:
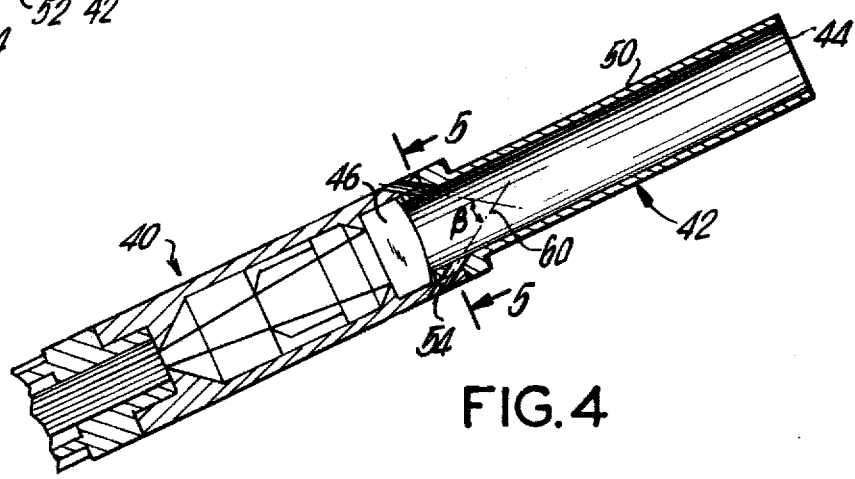
FIG. 4 is a partial cross-sectional view of the radiation pyrometer optical sight portion of the subject invention including the air purging unit.
Figure 5:
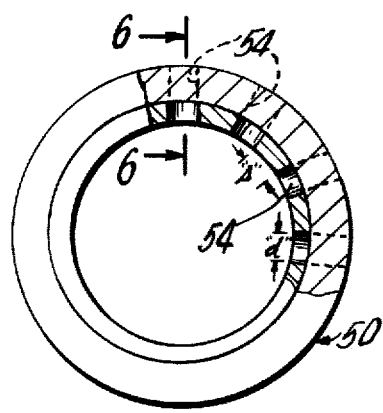
FIG. 5 is a cross-sectional view taken along line 5—5 in FIG. 4.
Figure 6:
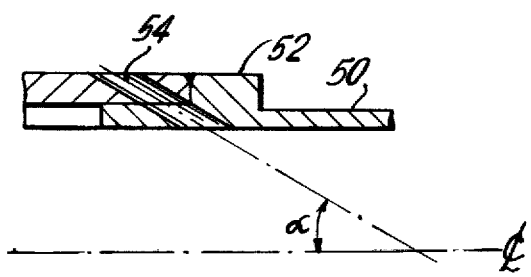
FIG. 6 is a cross-sectional view taken along line 6—6 in FIG. 5.

Turning to FIGS. 4, 5, and 6, the air purging unit 42 of the subject invention includes an elongated sight tube 50, one end 52 of which is mounted to the pyrometer adjacent the optical lens 46, and with the longitudinal axis of the elongated sight tube 50 being coincident with the longitudinal axis of the optical sight system 40. An array of spaced apertures 54 are provided in the end 52 of the elongated sight tube 50, with each aperture extending at an angle $\alpha$ relative to the longitudinal axis of the sight tube 50, and in a direction away from the optical lens 46, as shown in FIGS. 4 and 6. The angle $\alpha$ is preferably in the range of 25° to 30°. Each aperture 54 is preferably of the same diameter "d", with the spacing "s" (see FIG. 5) between adjacent apertures corresponding in dimensions to the diameter "d" of the apertures. By this arrangement, as shown in FIGS. 2 and 4, when pressurized compressor air disposed in the interior cavity defined by the inner casing 32 passes through the array of apertures 54, by virtue of potential jet flow, a fluid screen, designated by the numeral 60 is developed in front of the optical lens 60, with the configuration of the fluid screen 60 being generally conically-shaped. Since the apertures 54 are at an acute angle to the longitudinal axis of the sight tube 50, the included angle $\beta$ of the fluid screen 60 is preferably in the range of 50° to 60°. In operation, the conically-shaped fluid screen 60 functions as a shield to prevent contaminants from reaching and contaminating the optical lens 46.

A secondary fluid screen is provided in the subject air purging unit at the distal end 44 of sight tube 50, and is a supplement to the primary fluid screen 60. More particularly, the opening 32A in the casing wall 32 is of greater diameter than the diameter of the sight tube 50 whereby an annular spacing 70 is defined between the casing opening 34 and the outer surface of the tube 50. In operation, the cool, pressurized compressor air within the inner cavity defined by the inner casing wall 32 is expelled through the annular opening 70 into the lower pressure area through which the hot, high velocity combustion gases G pass so as to effectively form a secondary, generally cylindrical fluid screen about the distal end 44 of the sight tube 50. This secondary fluid screen aids in preventing contaminants within the high velocity combustion gas flow G from entering the open end 44 of the sight tube and obstructing the sight path of the lens of the radiation pyrometer. The cool compressor air as it flows along the length of the sight tube 50 and exits through the annular spacing 70 also functions to cool the sight tube, thereby inhibiting thermal distortion or bending of the tube.

Figure 3:
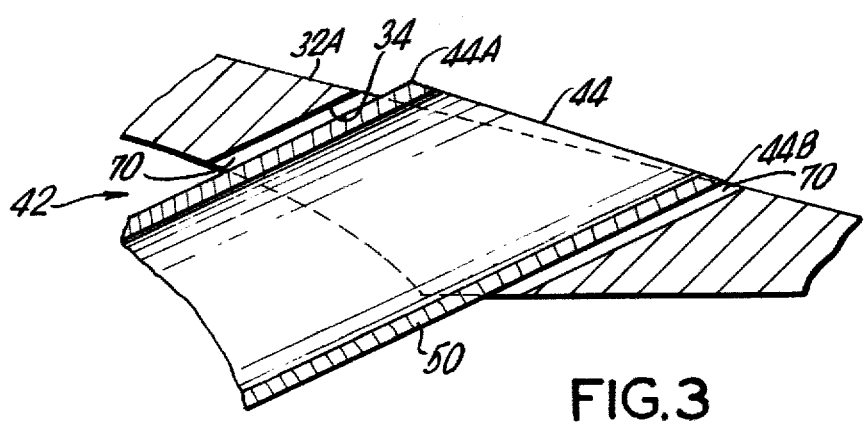
FIG. 3 is a detailed view in cross-section showing the mounting of the distal end of the sight tube of the air purging unit of the subject invention as mounted in the casing wall of the gas turbine engine.

As also shown in FIG. 3, the plane of the distal end 44 of the sight tube 50 is at an angle to the outer surface 32A of the inner casing wall 32. The sight tube is centrally mounted within the opening 34 and the configuration of the end 44 of the sight tube is positioned to define an upstream edge 44A and a downstream edge 44B relative to the direction of flow of the hot combustion gases G. The upstream edge 44A projects beyond the surface 32A of the inner casing 32, whereas the downstream ede 44B is substantially flush with the surface 32A. By this arrangement, as the hot combustion gases flow past the sight tube, the upstream edge 44A functions as a lip or deflector and deflects the hot combustion gases away from and thus effectively around the open end of the sight tube, thereby further aiding in preventing contaminants within the hot combustion gas flow from entering the sight tube and possibly contaminating the optical lens 46.

Figure 7:
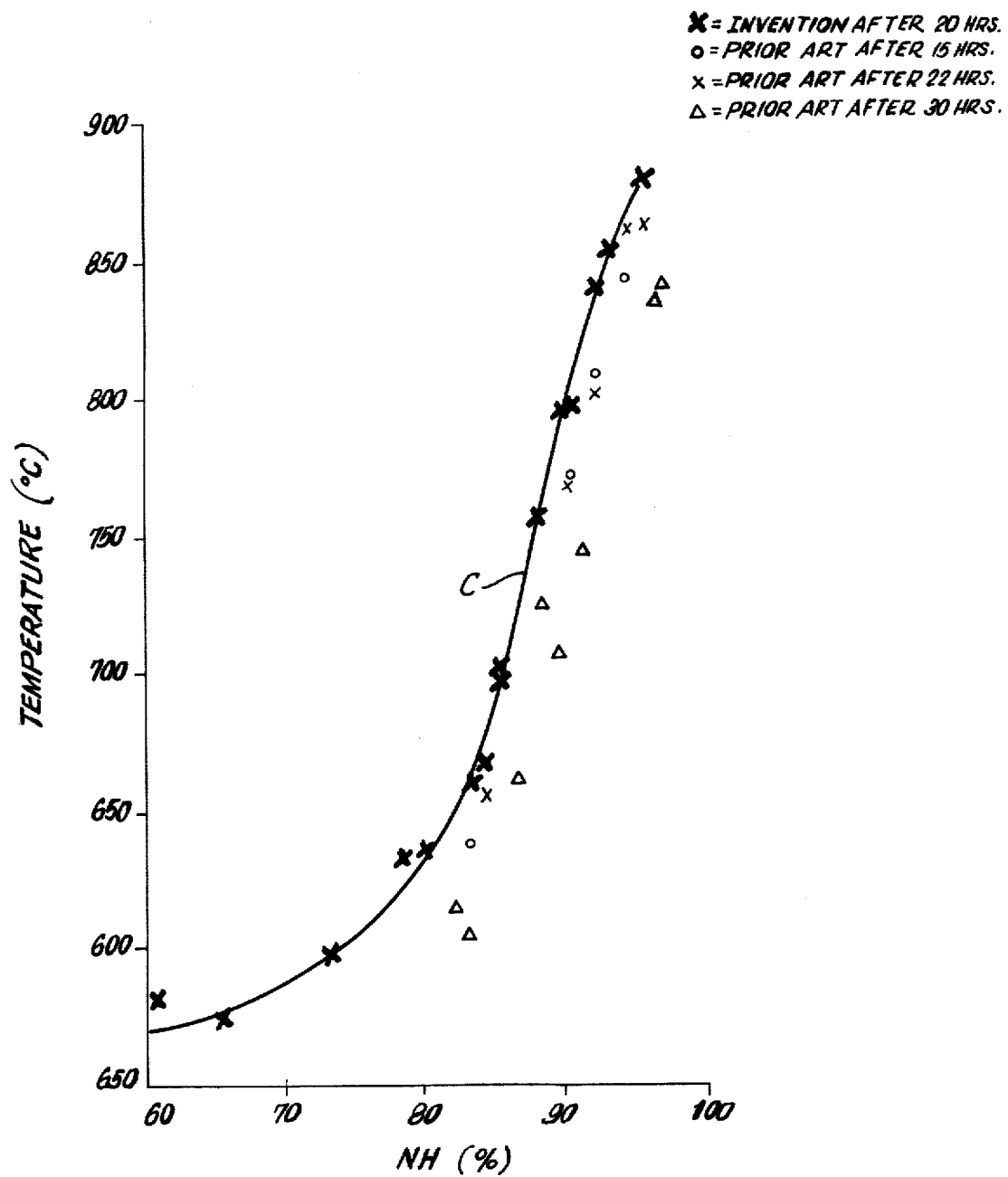
FIG. 7 is a graph of the temperature measured by a radiation pyrometer as a function of the speed of a gas turbine engine, and designating the test results utilizing the air purging unit of the subject invention as compared to a conventional device.

In summary, the composite effect of the primary, conically-shaped fluid screen 60, the cylindrical-shaped, secondary fluid screen passing through the opening 70, and the deflector lip 44A of the sight tube 50, minimizes contamination of the optical lens 46 and thus minimizes output signal attenuation of the radiation pyrometer. The air purging system of the subject invention utilizes available cool, pressurized airflow from the compressor present within the inner cavity defined by the inner casing wall 32. In addition to providing shielding of the optical lens from contaminants, the mounting of the sight tube insures that the tube is maintained at a relatively cool temperature thereby minimizing thermal distortion of the sight tube, and thus minimizing the possibility of erroneous signals being developed by the radiation pyrometer because of bending of the sight tube. As an example of the effectiveness of the air purging unit of the subject invention, reference is made to FIG. 7 which is a graph of temperature output of a radiation pyrometer in degrees centigrade versus the speed of rotation of the engine or rotor in percent of maximum speed. The line C represents the original calibration line for the radiation pyrometer. As shown in FIG. 7, when the radiation pyrometer is provided with an air purging unit according to the teachings of the subject invention, after 20 hours of operation of the engine, at various operating conditions, the output signals of the radiaion pyrometer correspond to the initial calibration of the radiation pyrometer. On the other hand, a conventional radiation pyrometer, as mounted in a jet engine, with a standard sight tube, progressively experiences attenuation of the output signal to the point where the output signal could not safely be used in connection with the operation of the jet engine. As clearly indicated, after operation of the standard radiation pyrometer with a conventional sight tube, the attenuation in the output signal relative to the original calibration signal is such as would normally require the engine to be stopped. The optical system of the radiation pyrometer would then have to be removed from the engine and thoroughly cleaned prior to continued operation of the engine. As is readily apparent, the dissassembly of the engine in order to obtain access to the radiation pyrometer is time consuming and costly, plus the fact that the output signals of the radiation pyrometer are inaccurate such that the use of a standard radiation pyrometer and conventional sight tube is not practical in conjunction with a gas turbine engine.

On the other hand, the test data shown in FIG. 7 in connection with the subject invention clearly indicates the efficiency of the subject air purge unit in maintaining the optical lens substantially free of contaminants whereby the output signals of the radiation pyrometer are accurate and repeatable.

Although the invention has been described with respect to a preferred embodiment, it is readily apparent that those skilled in the art will be able to make numerous modifications of the exemplary embodiments without departing from the spirit and scope of the invention. All such modifications are intended to be included within the spirit and scope of the invention as defined by the appended claims.

What is claimed is:

1. An air purging unit for a radiation pyrometer which is mounted in the inner casing of a gas turbine engine for detecting the temperature at a rotor stage, said radiation pyrometer including a detector at one end and an optical lens at the opposite end, said unit comprising: an elongated sight tube disposed about the lens end of the radiation pyrometer and extending through the wall of the engine which separates said rotor stage from the inner casing; said sight tube including an array of spaced apertures extending therethrough in the vicinity of said optical lens, each aperture extending at an acute angle to the longitudinal axis of the sight tube, and away from the optical lens such that compressor air within the inner casing of the engine passes through the array of apertures and effectively forms a conically-shaped fluid screen for preventing contamination of the optical lens; and said sight tube being mounted, relative to the wall, such that the downstream edge of the tube is substantially flush with said wall, whereas the upstream edge of said tube projects beyond the surface of the wall and into the airflow path of the combustion gases flowing to the rotor stage, whereby said upstream edge of the sight tube causes a deflection of the combustion gases around the circumference of the sight tube to thereby further inhibit contaminants from entering the sight tube and contaminating the optical lens.

2. An air purging unit for a radiation pyrometer as in claim 1 wherein the diameters of the apertures are equal, and the spacing between adjacent apertures substantially corresponds to the diameter of the apertures.

3. An air purging unit for a radiation pyrometer as in claim 1 wherein said apertures extend at an angle to the longitudinal axis of the sight tube such that the included angle of the conically-shaped fluid screen is in the range of 50-60 degrees.

4. An air purging unit for a radiation pyrometer as in claim 1 wherein the opening in the wall separating said rotor stage from said inner casing is greater than the diameter of the sight tube, with said tube being centrally mounted within said opening whereby the compressor air passing through said annular space between the wall and the sight tube forms a generally cylindrical, secondary fluid screen for preventing contamination of the optical lens.

5. An air purging unit for a radiation pyrometer which is mounted in the wall of the inner casing of a gas turbine engine for detecting the temperature at a rotor stage, said radiation pyrometer including a detector at one end and an optical lens at the opposite end, said air purging unit comprising an elongated sight tube, one end of which is secured to the optical lens end of the pyrometer while the other end of said sight tube extends through an opening in the inner casing wall, said sight tube being axially aligned with the longitudinal axis of said pyrometer, said sight tube including an array of spaced apertures extending therethrough in the vicinity of said optical lens, each aperture extending at an acute angle to the longitudinal axis of the sight tube away from the optical lens such that compressed air within the inner casing of the engine passes through the array of apertures and forms a conically-shaped primary fluid screen for preventing contamination of the optical lens, the opening in said casing wall being greater in diameter than the diameter of the sight tube, with the opposite end of said sight tube being centrally mounted within the said opening such that compressed air within the inner casing passes through the annular space between the casing wall and the sight tube to form a generally cylindrical, secondary fluid screen for inhibiting contamination of the optical lens, and with the opposite end of the sight tube having an upstream edge and a downstream edge relative to the combustion gases flowing to said rotor stage, said downstream edge of the sight tube being substantially flush with the surface of the casing wall exposed to said combustion gases, whereas the upstream edge of said sight tube projects beyond said surface of the casing wall and into the flow path of the combustion gases, whereby said upstream edge of the sight tube causes a deflection of the combustion gases to further inhibit contamination of said optical lens.

6. An air purging unit for a radiation pyrometer as in claim 5 wherein the diameters of the apertures are equal.

7. An air purging unit for a radiation pyrometer as in claim 6 wherein the spacing between adjacent apertures substantially corresponds to the diameter of the apertures.

8. An air purging unit for a radiation pyrometer as in claim 5 wherein said apertures extend at an angle to the longitudinal axis of the sight tube such that the included angle of the conically-shaped primary fluid screen is in the range of 50–60 degrees.

* * * * *